United States Patent
Clarke et al.

(10) Patent No.: US 7,270,911 B2
(45) Date of Patent: *Sep. 18, 2007

(54) LOAD LEVELING BATTERY AND METHODS THEREFOR

(75) Inventors: Robert Lewis Clarke, Orinda, CA (US); Brian Dougherty, Menlo Park, CA (US); Stephen Harrison, Benicia, CA (US); Peter J. Millington, Weaverham (GB); Samaresh Mohanta, Fremont, CA (US)

(73) Assignee: Plurion Limited, Glasgow (GB)

( * ) Notice: Subject to any disclaimer, the term of this patent is extended or adjusted under 35 U.S.C. 154(b) by 391 days.

This patent is subject to a terminal disclaimer.

(21) Appl. No.: 10/483,951

(22) PCT Filed: Aug. 10, 2001

(86) PCT No.: PCT/US01/41678

§ 371 (c)(1),
(2), (4) Date: May 24, 2004

(87) PCT Pub. No.: WO03/017407

PCT Pub. Date: Feb. 27, 2003

(65) Prior Publication Data

US 2004/0197649 A1    Oct. 7, 2004

(51) Int. Cl.
*H01M 4/36* (2006.01)

(52) U.S. Cl. .......... 429/105; 429/204; 429/218.1; 429/229

(58) Field of Classification Search ............ None
See application file for complete search history.

(56) References Cited

U.S. PATENT DOCUMENTS

| | | | |
|---|---|---|---|
| 3,769,089 A * | 10/1973 | Oomen et al. ............ 429/199 |
| 4,784,924 A | 11/1988 | Savinell et al. |
| 4,814,241 A * | 3/1989 | Nagashima et al. ....... 429/199 |
| 5,061,578 A * | 10/1991 | Kozuma et al. ............ 429/3 |
| 5,318,865 A | 6/1994 | Kaneko et al. |
| 5,366,824 A | 11/1994 | Nozaki et al. |
| 5,610,802 A | 3/1997 | Eidler et al. |
| 5,851,694 A | 12/1998 | Miyabashi et al. |
| 6,468,688 B2 | 10/2002 | Kazacos et al. |
| 6,475,661 B1 | 11/2002 | Pellegri et al. |
| 6,613,298 B2 | 9/2003 | Tanaka |
| 6,652,819 B2 | 11/2003 | Shiroto |
| 6,692,862 B1 | 2/2004 | Zocchi |

OTHER PUBLICATIONS

Iwasa, et al., Fundamental Studies on the Electrolyte Solutions of Novel Redox Flow Battery for Electricity Storage, 2001.
Fang, et al., A Study of the Ce(III)Ce(IV) Redox Couple For Redox Flow Battery Application, Apr. 8, 2002.

* cited by examiner

*Primary Examiner*—Jonathan Crepeau
*Assistant Examiner*—Tony Chuo
(74) *Attorney, Agent, or Firm*—Fish & Associates, PC

(57) ABSTRACT

A load leveling battery (122) comprising an electrolyte that includes a cerium zinc redox pair wherein preferred electrolytes are acid electrolytes, and most preferably comprise methane sulfonic acid. Contemplated load leveling batteries (122) have an open circuit voltage of at least 2.4 Volt per cell. Such batteries are useful at power grid substations (120) and commercial and industrial applications were large amounts of power are used. Preferred capacity is at least 100,000 kWh, more preferably 250,000 kWh.

14 Claims, 1 Drawing Sheet

LOAD LEVELING BATTERY AND METHODS THEREFOR

FIELD OF THE INVENTION

The field of the invention is load leveling batteries.

BACKGROUND OF THE INVENTION

Increasing demand of electricity during peak hours and relatively high costs of retrofitting a power grid to the increased demand made the use of load leveling batteries in utility systems economically increasingly attractive. Among various types of known load leveling batteries, lead acid batteries have been relatively common. However, due to numerous problems associated with lead acid batteries (e.g., relatively low power density, environmentally problematic, relatively short service intervals, etc.), alternative load leveling battery systems have been developed.

For example, metal-sulfur batteries, and especially sodium-sulfur (e.g., KEPCO Kansai Electric Power Co., Inc. Osaka, Japan) and lithium-sulfur batteries have been employed as load leveling batteries. While metal-sulfur batteries generally exhibit significant increase in power density, all or almost all of them remain environmentally problematic. In another example, zinc-halogen, and especially zinc chloride and zinc bromine batteries (e.g., ZBB Energy Corp.) may be employed as load leveling batteries. The capacity of zinc halogen batteries is advantageously determined by the volume of the electrolytes, and therefore exhibits a favorable power-to-weight ratio in many configurations. Moreover, zinc halogen batteries tend to have a relatively long cycle time. Unfortunately, the use of halogens in such batteries is often problematic in various aspects. Among other things, zinc halogen batteries often require use of specialty materials (e.g., polymers in the electrode frames need to be resistant to corrosion by the halogens), thereby increasing the cost of production. Moreover, leakage of such batteries frequently poses a significant health and environmental hazard.

To overcome at least some of the problems associated with environmentally hazardous components, vanadium-based load leveling batteries may be employed, in which vanadium ions in the anolyte and catholyte cycle between $2^+/3^+$ and $4^+/5^+$ oxidation states. The use of vanadium significantly reduces potential threats to health and environment. Moreover, only the volumes of anolyte and catholyte generally limit the capacity of such batteries. However, using vanadium ions as redox couples typically limits the nominal cell voltage to 1.2V, thereby significantly increasing the size of load leveling batteries.

Thus, it would be desirable to have a load leveling battery that employs both a redox couple and battery chemistry with minimal health and environmental impact while providing an increased cell voltage. Among the most popular redox/electrical couples are those containing zinc. Zinc is regarded as the highest energy couple component that can be cycled in an aqueous room temperature battery and is therefore commonly used in numerous battery and power cell applications. Depending on the type of coupling partner such zinc containing batteries will exhibit various characteristic properties.

For example, zinc is coupled with carbon in most simple flashlight batteries to provide a relatively inexpensive and reliable power source. Although manufacture of Zn/C batteries is generally simple and poses only relatively little environmental impact, various disadvantages of Zn/C batteries and power cells exist. Among other things, the ratio of power to weight in commonly used Zn/C batteries is relatively poor, and such batteries are typically primary batteries. Consequently, Zn/C batteries are generally less desirable for load leveling applications. To improve the ratio of power to weight, alternative coupling partners and systems can be employ. For example, zinc can be coupled with silver to achieve an improved power to weight ratio. However, while silver as a coupling partner for zinc is environmentally substantially neutral and significantly improves the power to weight ratio, the use of silver is in many instances economically prohibitive and typically exhibits a poor cycle life.

In still further known batteries and power cells, zinc is coupled with still other metals such as nickel, copper, or manganese to provide a specific desired characteristic. However, and depending on the particular metal, new disadvantages may arise and particularly include environmental problems with manufacture and/or disposal, relatively low power to weight ratio, and undesirably low open circuit voltage.

Alternatively, oxygen may be employed as a gaseous coupling partner for zinc, thereby generally avoiding problems associated with toxicity, excessive cost for coupling partners, or spillage. Using air (i.e., oxygen) as coupling partner for zinc typically results in a relatively high power to weight ratio. Moreover, the zinc-oxygen system typically provides a relatively flat discharge curve. However, rechargeable zinc air batteries often exhibit relatively fast electrode deterioration. Moreover, experimental rechargeable zinc-air batteries have been built for use in automotive applications and typically use a liquid electrolyte that is recirculated via a pump. However, such systems are often impractical for load leveling applications.

An additional problem with zinc-air batteries often arises from the use of an alkaline electrolyte, which is typically disposed between a porous zinc anode and an air cathode formed of a carbon membrane. Unfortunately, the use of alkaline electrolytes in such electrodes frequently leads to absorption of carbon dioxide, and consequently formation of carbonates, which in turn tend to reduce conductivity and clog the pores in the active surfaces of the electrodes.

Thus, despite various advances in power cell technology, known systems and methods all suffer from significant problems. Therefore, there is still a need to provide compositions and methods for improved power cells.

SUMMARY OF THE INVENTION

The present invention is directed to a load leveling battery having an electrolyte that includes a cerium-zinc redox pair.

In one aspect of the inventive subject matter, contemplated electrolytes include acid electrolytes, and a particularly contemplated acid electrolyte comprises an organic acid, most preferably methane sulfonic acid.

In another aspect of the inventive subject matter, contemplated load leveling batteries have an open circuit voltage of at least 2.4 Volt per cell, a capacity of at least 100.000 kWh, and more preferably a capacity of at least 250.000 kWh.

In a further aspect of the inventive subject matter, contemplated applications for such batteries include power stations that are a substation of a power grid, which may advantageously further comprise an inverter, a rectifier, and storage tanks for both anolyte and catholyte.

Various objects, features, aspects, and advantages of the present invention will become more apparent from the following detailed description of preferred embodiments of the invention, along with the accompanying drawing.

DETAILED DESCRIPTION

Figure 1:
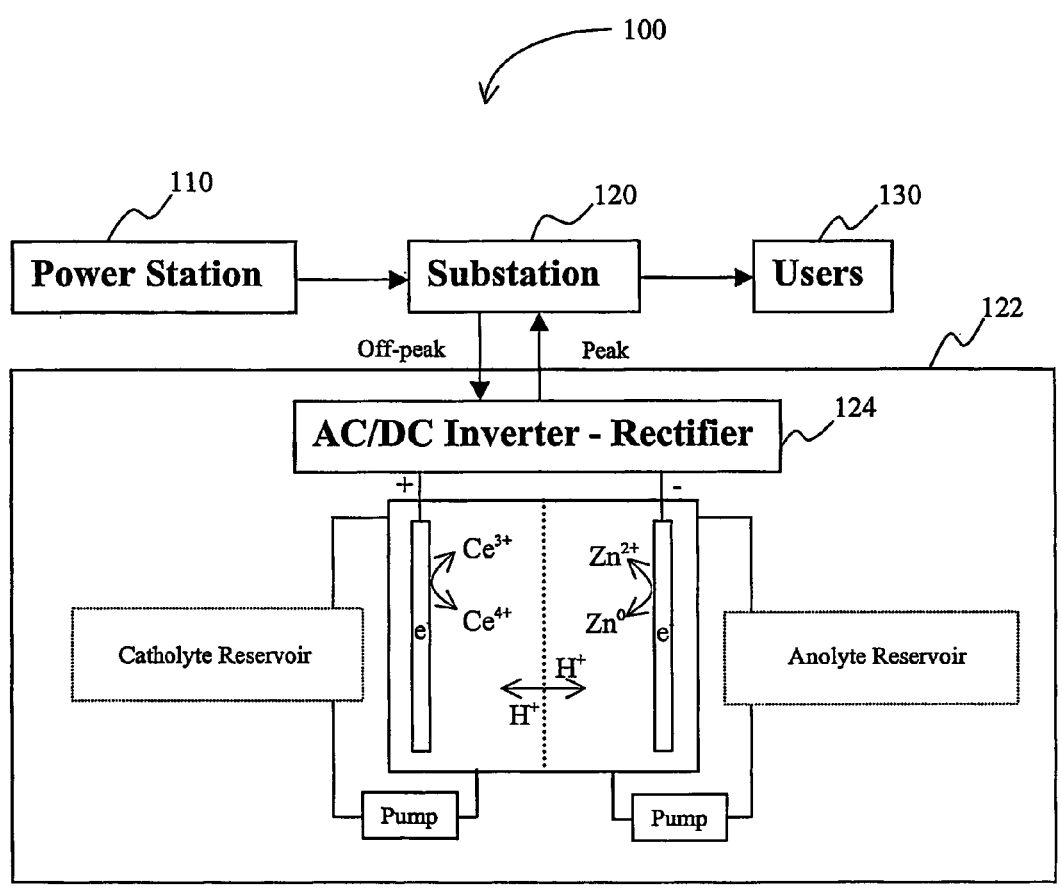
FIG. 1 is a schematic view of a load leveling battery configuration according to the inventive subject matter.

The inventors have discovered that a load leveling battery may be manufactured using a cerium-zinc redox pair. More particularly, the inventors contemplate that zinc in acid solution may be employed as the basis of such batteries when coupled with concentrated solution of ceric ions in an aqueous solution of an organic acid, and especially methane sulfonic acid.

Based on previous experiments (infra), such redox couples have an open circuit voltage of at least 2.4 volts, and more typically 2.46 volts, which is superior to numerous other redox couples. It is generally believed that in secondary batteries zinc needs to be dissolved into solution on discharge of the battery and replaced on the electrode during charging following the equation (I) below.

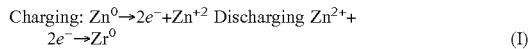

Charging: $Zn^0 \rightarrow 2e^- + Zn^{+2}$ Discharging $Zn^{2+} + 2e^- \rightarrow Zr^0$ (I)

Consequently, the inventors contemplate to employ an acid electrolyte for this transformation. Zinc, however, is known to form zinc dendrites from acid electrolytes, and zinc dendrites often tend to grow across the electrode gap and short out the cell. Thus, the inventors contemplate to complex $Zn^{2+}$ ions in solution to prevent or substantially reduce dendrite formation, and especially contemplated chelating agents include various zinc chelating agents (e.g., EDTA (ethylenediaminetetraacetic acid), or modified versions of EDTA).

It should be especially appreciated that acidic electrolytes have several advantages over currently commercially used alkaline electrolytes. For example, alkaline electrolytes absorb and react with carbon dioxide to form carbonates, which frequently reduce conductivity and block the pores in the active materials of the battery causing failure. Carbon dioxide can come from various sources, including atmospheric $CO_2$, and from breakdown products of the carbon used in the manufacture of the air electrode. Replacing the alkaline electrolyte with an acid significantly reduces, if not even avoids these problems.

With respect to the acid electrolyte, it is contemplated that various organic and inorganic acids may be used. However, particularly preferred acids include organic acids and all acids that are able to dissolve ceric ions, cerous ions and zinc ions at a relatively high concentration (e.g., greater than 0.2M, more preferably greater than 0.5M, and most preferably greater than 0.7M). A particularly preferred organic acid that dissolves ceric and cerous ions at a relatively high concentration is methane sulfonic acid. Preferred concentrations of methane sulfonic acid include concentrations between 1M and 4M, and more preferably between 2.5M and 3.5M. However, alternative organic acids also include trifluoromethane sulfonic acid ($CF_3SO_3H$), which typically makes a better solvent anion than methane sulfonic acid for ceric ions. Still further contemplated acids include perchloric acid ($HClO_4$), nitric acid, hydrochloric acid (HCl), or sulfuric acid ($H_2SO_4$). However, such alternative acids may impose safety concerns or exhibit less advantageous capability to dissolve high concentrations of ceric ions.

With respect to the amount of cerium, it is contemplated that the cerium ion concentration in the electrolyte is at least 0.2M, more preferably at least 0.5M, and most preferably at least 0.7M, and it is further preferred that cerium ions are added to the electrolyte solution to concentrations that lies within 5-95% of the solubility maximum of cerium ions in the electrolyte at a pH<7 and 20° C. Furthermore, while it is preferred that cerium is added in form of cerium carbonate, numerous alternative forms, including cerium hydrate, cerium acetate, or cerium sulfate are also contemplated. Similarly, the concentration of zinc ions in the electrolyte is at least 0.3M, more preferably at least 0.8M, and most preferably at least 1.2M.

In an exemplary Zn/Ce redox system using methane sulfonic acid, it is contemplated that the following reactions occur during charging:

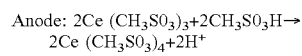

Anode: $2Ce\,(CH_3SO_3)_3 + 2CH_3SO_3H \rightarrow 2Ce\,(CH_3SO_3)_4 + 2H^+$

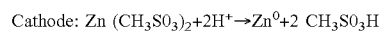

Cathode: $Zn\,(CH_3SO_3)_2 + 2H^+ \rightarrow Zn^0 + 2\,CH_3SO_3H$

Written in another form:

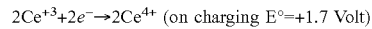

$2Ce^{+3} + 2e^- \rightarrow 2Ce^{4+}$ (on charging $E° = +1.7$ Volt)

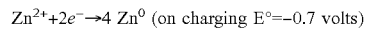

$Zn^{2+} + 2e^- \rightarrow 4\,Zn^0$ (on charging $E° = -0.7$ volts)

These reactions are reversed on discharge. Consequently, it is contemplated that only hydrogen ions are moving through the membrane. Thus, particularly contemplated membranes include those that allow flow of hydrogen across the membrane. There are numerous such membranes known in the art, and all of those are deemed suitable for use in conjunction with the teachings presented herein. However, a particularly preferred membrane includes a Nafion® membrane (perfluorosulfonic acid/PTFE copolymer in the acid form; commercially available from DuPont, Fayetteville, N.C.). In further alternative aspects of the inventive subject matter, it is contemplated that EDTA or alternative chelating agents could replace at least a portion, if not all of the methane sulfonic acid in at least the zinc cathode part of the cell.

Since the capacity of contemplated batteries is typically only limited by the supply of the anolyte and catholyte, particularly useful applications include load leveling batteries at power substations and commercial/industrial locations where large amounts of power are being stored. Depending on the available supply of the catholyte and anolyte, it is contemplated that suitable load leveling batteries will have a capacity of at least 100.000 kWh, more preferably 250.000 kWh, and it is further contemplated that such batteries will typically require a space of less than about 7 meters by 7 meters at a height of no more than 2 meters. It should still further be appreciated that contemplated batteries have a relatively high current density (about 0-400, more preferably between 400 and 1000, and most preferably between 1000 and 2000 A/m²) and high power-to-weight ratio, while being significantly less problematic with regard to the environment and health of operators/manufacturers than numerous alternative known load leveling batteries.

FIG. 1 depicts an exemplary configuration 100, in which a power station 110 provides electricity to a substation 120, which further distributes the electricity to a plurality of end users 130. Substation 120 is further electrically coupled to (and preferably houses) the load leveling battery 122, which may optionally comprise an inverter rectifier unit 124. Depending on the type of substation, the desired voltage and the inverter rectifier unit, it should be appreciated that the number of battery cells in contemplated load leveling batteries may vary considerably. However, it is generally preferred that contemplated load leveling batteries comprise between about 10 and 200 battery cells, and more typically between 50-100 battery cells. Moreover, it is contemplated that suitable load leveling batteries will include a storage tank for anolyte and catholyte. During off-peak hours (e.g., between 11 pm and 4 am), the substation provides electrical energy to at least partially charge the load leveling battery, and during peak hours or minutes, it is contemplated that the load leveling battery provides electricity to the substation.

Particularly contemplated power stations are substations that receive electricity in the range of between about 100 KV to 300 KV (e.g., 161 KV) and transform the incoming electricity to a voltage of between about 10 KV to 50 KV (e.g., 25 KV). However, it should be appreciated that suitable substations may also operate using voltages higher than 300 KV, including 300 KV to 600 KV, but also voltages lower than 300 KV, including 300 KV to 75 KV. In a still further contemplated aspect of the inventive subject matter, contemplated load leveling batteries my also be employed in a residential environment. For example, suitable load leveling batteries may be employed in a single household in which renewable (e.g., solar or hydropower) or non-renewable energy (e.g., electricity provided by a utility) is temporarily stored.

EXPERIMENTS

Rechargeable Zn—Ce Battery

To validate the concept of a rechargeable battery comprising an electrolyte that includes a cerium-zinc redox pair, a cell was made up by using four blocks of plastic Ultra High Molecular Weight Polyethylene (UHMWP), with gaskets in between each face, two electrodes and one membrane. Electrolyte inlets and outlets were made in the center sections and electrolyte fed from two small tanks via a peristaltic pump. The cerium solution contained 106 grams $Ce_2(CO_3)_3 * 5H_2O$ in 480 ml methane sulfonic acid and 320 ml of water. The zinc solution contained 65 grams zinc carbonate in 240 ml methane sulfonic acid and 160 ml of water. The ceric solution was fed to the anode made of coated titanium mesh ($TiO_2$), and the zinc solution was fed to a titanium cathode. Cell gap was 2.54 cm, flow rate about 2 liter per minute.

The cell was charged at 0.5 amps (current density is 50 milliamps/$cm^2$) for five hours. The colorless cerous methane sulfonate turned yellow and the open circuit cell voltage was 3.33 volts. Only 3 grams of zinc would have been deposited by this time if the cell were running at 100% current efficiency. The cell was run overnight at 0.2 amps current and then a further 5 hours at 0.5 amps. The open circuit voltage maximum was 2.4 volts and the voltage across the cell during charging at 0.5 amps was 2.7 volts. The cell was emptied and the cathode side contained approximately 9 grams of zinc, in very close agreement with theory for the charge passed. The zinc was placed in the electrolyte and the rate of spontaneous dissolving of the zinc noted as slow: 50% of the zinc was still observed after two hours, and some zinc still remained after 72 hours. Furthermore, very little gassing at the anode or cathode was observed during the charging process. The zinc formed granular nodules on the titanium cathode and eventually plated on the face of the membrane, and the ceric anode looked very good.

Zn—Ce Load Leveling Battery

In a second set of experiments, a scaled up-version of the above described Zn—Ce battery was constructed using a serial assembly of bipolar electrolyzers with suitable electrodes (e.g., titanium, carbon, or lead), wherein each of the electrodes had a surface area of about 1 $m^2$. The electrodes were separated by a suitable membrane (e.g. Nafion or Goretex), and the volume of anolyte and catholyte reservoirs was approximately 200 L. In a typical configuration, the electrolyte composition on the Zn-plating side included 1.2M zinc ions, 0.7M cerium ions, and 2.8M methylsulfonic acid, while on the cerium side the electrolyte composition included 0.8M zinc ions, 0.7M cerium ions, and 3.5M methyl-sulfonic acid.

Thus, specific embodiments and applications of improved load leveling batteries have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A load leveling battery having an electrolyte comprising an organic acid and that includes a cerium-zinc redox pair, in which reduction of cerium and oxidation of zinc produce current provided by the battery.

2. The load leveling battery of claim 1 wherein the organic acid comprises methane sulfonic acid.

3. The load leveling battery of claim 2 further comprising an open circuit voltage of at least 2.4 Volt per cell.

4. The load leveling battery of claim 1, wherein the battery is configured to have a capacity of at least 100.000 kWh.

5. The load leveling battery of claim 1, wherein the battery is configured to have a capacity of at least 250.000 kWh.

6. The load leveling battery of claim 1 wherein the load leveling battery is located at a power grid substation.

7. The load leveling battery of claim 1 wherein the load leveling battery is located at a commercial or industrial site.

8. The load leveling battery of claim 6 wherein the load leveling battery further comprises an inverter and a rectifier.

9. The load leveling battery of claim 1 further comprising a first storage tank for an anolyte and a second storage tank for a catholyte.

10. A rechargeable load leveling battery having an acid electrolyte that includes a cerium-zinc redox pair, in which reduction of cerium in a liquid phase and oxidation of zinc from a solid phase produce current provided by the battery.

11. The load leveling battery of claim 10 wherein the solid phase is disposed on an electrode.

12. The load leveling battery of claim 10 wherein the acid electrolyte comprises an organic acid.

13. The load leveling battery of claim 12 wherein the organic acid comprises methane sulfonic acid.

14. The load leveling battery of claim 12 wherein the battery is configured to have a capacity of at least 100,000 kWh.

* * * * *